United States Patent [19]

Reiss et al.

[11] Patent Number: 4,558,907
[45] Date of Patent: Dec. 17, 1985

[54] CONTROL VALVE DEVICE ARRANGED FOR DIRECT OR GRADUATED RELEASE OPERATION

[75] Inventors: John R. Reiss, N. Versailles; Richard Katz, Plum Borough, both of Pa.

[73] Assignee: American Standard Inc., Wilmerding, Pa.

[21] Appl. No.: 642,846

[22] Filed: Aug. 20, 1984

[51] Int. Cl.⁴ .............................................. B60T 15/54
[52] U.S. Cl. .......................................... 303/74; 303/36
[58] Field of Search ....................... 303/36, 37, 38, 39, 303/72, 73, 74

[56] References Cited

U.S. PATENT DOCUMENTS

| | | | |
|---|---|---|---|
| 3,429,620 | 2/1969 | Scott | 303/36 |
| 4,025,126 | 5/1977 | Wilson | 303/33 |
| 4,033,632 | 7/1977 | Wilson | 303/74 |
| 4,125,292 | 11/1978 | Worbois et al. | 303/36 |

Primary Examiner—Duane A. Reger
Attorney, Agent, or Firm—G. J. Falce

[57] ABSTRACT

In a brake control valve device for railway vehicles in which a bias spring acts on the piston stack assembly of the valve device, an additional air reservoir and a differential check valve are arranged to assure proper full service brake pressure, when the control valve device is operated in a direct release mode, thereby overcoming the effect of the bias spring in producing a force balance to cause the piston stack assembly to assume a lap condition before full service brake pressure is achieved. The arrangement has no adverse effect when the control valve device is operated in a graduated release mode.

7 Claims, 1 Drawing Figure

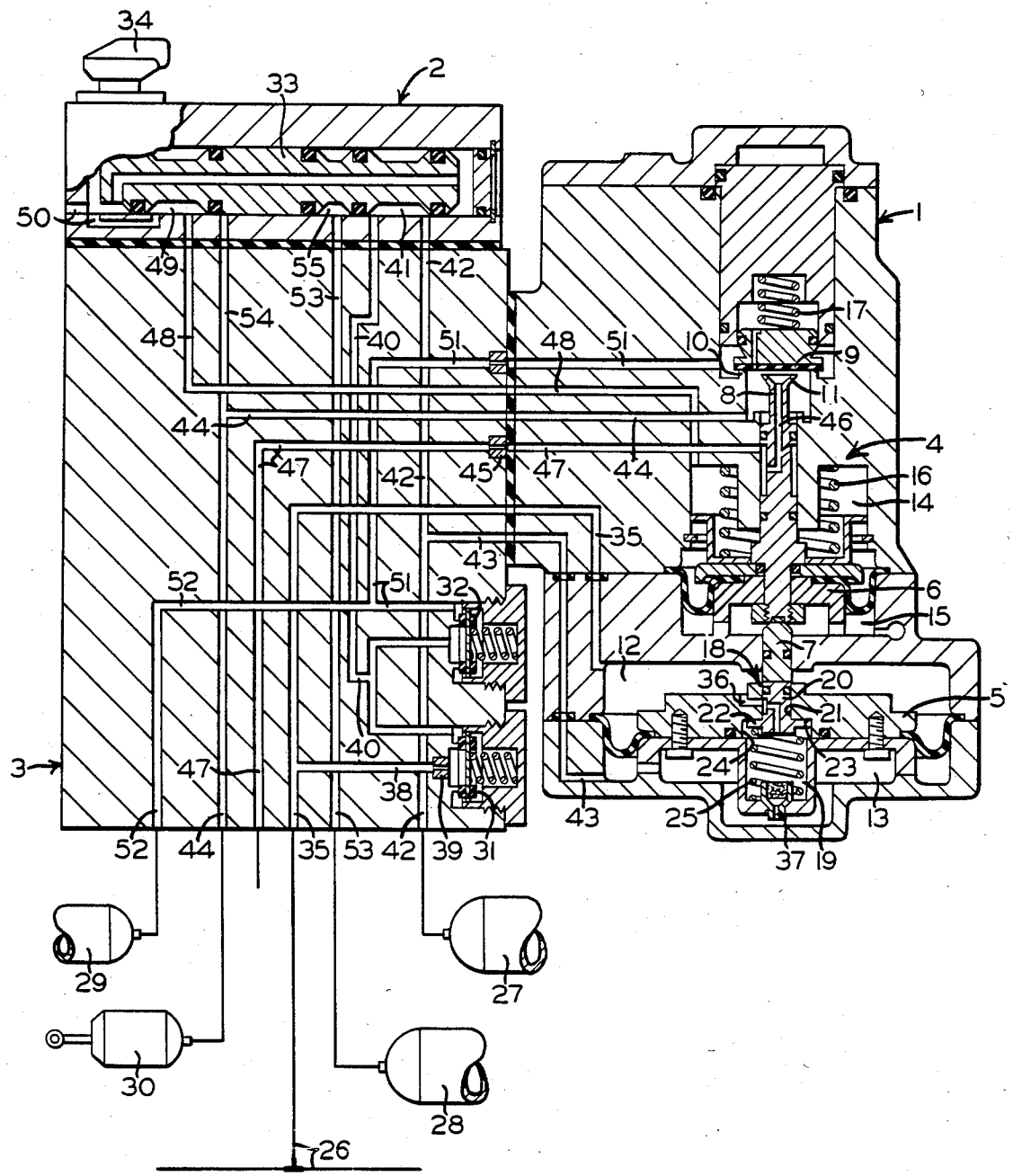

1

CONTROL VALVE DEVICE ARRANGED FOR DIRECT OR GRADUATED RELEASE OPERATION

BACKGROUND OF THE INVENTION

The present invention relates to proportioning or self-lapping type valve devices and particularly to such valve devices when arranged in railway brake systems to operate in either a direct release mode or a graduated release mode.

In U.S. Pat. No. 4,033,632, there is disclosed a proportioning type control valve capable of being operated in either a direct or graduated release mode by positioning a manual selector valve. In direct release mode, the valve operates on the pressure equalization principle and in graduated release mode, the valve operates on the pressure proportioning principle. Operation in graduated release mode is satisfactory, but in direct release mode, an overreduction of brake pipe pressure is required to obtain a full service brake pressure corresponding to the full service brake pressure obtained in graduated release mode. This is due to the fact that a relatively strong return spring is required to bias the smaller piston of a dual piston service valve assembly toward its release position in order to assure that during a subsequent brake application, movement of the larger piston of the service valve assembly will first compress the spring of a charging and dissipation valve, so that this valve can close before the larger piston movement is transmitted to the smaller piston, via the charging and dissipation valve, to in turn cause the smaller piston to actuate a supply valve via which pressure is supplied to the brake cylinder. The effect of the large return spring is compensated for in graduated release mode by the size ratio between the large and small pistons, with the brake pressure acting on the small piston and a constant reference pressure acting on the large piston. However, in direct release mode, the smaller piston is vented to atmosphere and the pressure on the larger piston is used as a supply pressure and is thus not constant. Accordingly, the bias effect of the return spring causes the service valve to prematurely assume a lap position in which the service valve terminates the supply of pressure to the brake cylinder displacement reservoir, so that a full service brake application in direct release mode is less than a full service brake application in graduated release mode.

SUMMARY OF THE INVENTION

The object of the present invention is to arrange a proportioning type brake control valve to provide the same full service brake cylinder pressure in direct release mode as in graduated release mode.

Another object of the invention is to limit the maximum service brake cylinder pressure capable of being achieved in graduated release mode to a value corresponding to the full service brake cylinder pressure attained in direct release mode.

These objectives are achieved in the present invention through the addition of a differential check valve and service reservoir, the latter being charged via the differential check valve and providing the supply of brake cylinder air in parallel with either a control reservoir or an auxiliary reservoir depending upon the selected mode of brake control being graduated release or direct release.

The additional air provided by the service reservoir assures that in direct release mode the desired full service brake pressure will be produced, notwithstanding the fact that the service valve prematurely terminates the brake application due to the bias effect of the release spring acting on the service valve assembly. The service reservoir air is supplied to the brakes in parallel with the control reservoir air via the differential check valve, which has a bias value corresponding to the amount by which the control reservoir pressure is higher than the equalized service reservoir pressure following a full service brake application. This will assure that the control reservoir pressure in excess of full equalization pressure is unable to pass the differential check valve to increase brake pressure, in the event the service valve is actuated due to an overreduction of brake pipe pressure.

BRIEF DESCRIPTION OF THE DRAWING

These and other objects and attendant advantages of the present invention will become more readily apparent from the following more detailed explanation when taken in conjunction with the single FIGURE drawing showing diagrammatically brake control apparatus for a railway vehicle selectively arranged to operate the vehicle brakes in either a graduated or direct brake release mode.

DESCRIPTION AND OPERATION

The brake control apparatus of the invention comprises a service valve device 1, a selector valve 2 for setting up the service valve device in either a graduated or direct brake release mode, and a pipe bracket 3, to which the service valve device and pipe bracket are mounted.

The service valve device 1 includes a valve assembly 4 formed by a main diaphragm piston abutment 5, a smaller diaphragm feedback piston abutment 6 that cooperates with the main piston abutment 5 via a pusher stem 7, a valve stem 8 integral with the feedback piston abutment 6, a valve member 9 adapted to engage an annular supply valve seat 10 formed on the body in which the valve assembly operates and/or an annular exhaust valve seat 11 formed on the end of valve stem 8.

Main piston abutment 5 cooperates with a hollow in the service valve body to form a chamber 12 on the upperside of the piston abutment and a chamber 13 on the underside. In a like manner, feedback piston abutment 6 cooperates with the service valve body to form a chamber 14 on its upperside and an atmospheric chamber 15 on its underside. A return spring 16 is disposed in chamber 14 between the valve body and piston abutment to urge the latter toward a release position, as shown, wherein exhaust valve seat 11 is disengaged from valve member 9 and a spring 17 urges valve member 9 into engagement with supply valve seat 10.

A charging and dissipation valve 18 is carried in a cavity 19 of the main piston abutment 5 and comprises a spool valve member 20 that operates in a bore 21. A lip 22 is formed at one end of spool member 20, while the opposite end is engageable with pusher stem 7. A shoulder 23 formed by a counterbore 24 of bore 21 serves as a stop against which lip 22 is seated in release position of the valve assembly by a spring 25 that is housed within cavity 19. This spring 25 acting through spool member 20 and pusher stem 7 exerts a lighter force on feedback piston abutment 6 than the force exerted in the opposite direction by return spring 16, in order to allow main piston abutment 5 to move upwardly relative to the spool member 20 when a brake application is initiated, as hereinafter explained.

In addition to pipe bracket 3 providing a means of mounting service valve device 1 and selector valve 2, it also provides an interface via which the system piping connects a brake pipe 26, a control reservoir 27, an auxiliary reservoir 28 having the same volume as control reservoir 27, a service reservoir 29, and a brake cylinder device 30 to service valve device 1. The volume of control reservoir 27 is such that the control reservoir pressure equalizes with the brake cylinder displacement volume at 50 psi. from a 70 psi. initial charge. Also, a charging check valve 31 and a differential check valve 32 are contained in pipe bracket 3.

Selector valve 2 comprises a spool valve member 33 and a handle 34 by means of which the spool member may be moved from a direct release position, in which it is shown, to a graduated release position and vice versa. In positioning the spool member, various passageways in the pipe bracket are connected to set up the service valve device 1 for the desired direct or graduated brake release mode of operation.

In the direct release mode shown, the service valve device and related apparatus are charged from the train brake pipe 26, which in brake release, is maintained at a preselected pressure, such as 70 psi., by the locomotive brake valve device (not shown), in a manner well known to those skilled in the railway braking art. From brake pipe 26, compressed air is connected to a passage 35 leading to chamber 12 and thence via a passage 36 in the main piston abutment, a groove in spool valve 20, cavity 19, and a choke 37, to chamber 13. Concurrently, compressed air is connected from passage 35 to control reservoir 27 and to chamber 13 via branch passage 38 of passage 35, a charging choke 39, charging check valve 31, a passage 40, a groove 41 in selector valve spool 33, and passages 42 and 43. The pressure in control reservoir 27 and in chamber 13 is thus charged to the value of brake pipe pressure effective in chamber 12, i.e. 70 psi., thereby rendering return spring 16 effective to maintain valve assembly 4 in the shown release position, wherein exhaust valve seat 11 is disengaged from valve member 9. Accordingly, brake cylinder device 30 is vented to atmosphere via a passage 44, the open exhaust valve, a central passage 46 in valve stem 8, a passage 47, and a release control choke 45. Chamber 14 above the feedback piston abutment is also vented to atmosphere via a passage 48, spool groove 49, and a passage 50 of selector valve 2. With both chambers 14 and 15 thus vented to atmosphere, there is no force imposed on valve assembly 4 of the service valve device by feedback piston abutment 6.

Service reservoir 29 is charged from brake pipe 26 via passage 35, branch passage 38, charging choke 39, charging check valve 31, passage 40, differential check valve 32, passage 51, and passage 52 to a value that is less than the brake pipe pressure, due to the spring bias of differential check valve 32.

When a brake application is made, the brake pipe air is released, in a well known manner, accordingly effecting a release of the air in chamber 12 via passage 35. The one-way action of check valve 31 prevents the air in chamber 13 from flowing to the brake pipe, except via choke 37 of the charging and dissipation valve 18, so that a pressure differential and thus an upward acting force is established across the main piston abutment 5. This force initially moves piston abutment 5 relative to spool valve member 20, due to the force of spring 16 acting on the spool member via piston abutment 6 and stem 7, thereby repositioning the spool, so as to cut off the charging and dissipation valve communication between chambers 12 and 13. Continued upward movement of main piston abutment 5 picks up spool valve member 20, which in turn forces pusher stem 7 and valve stem 8 upwardly also. Exhaust valve seat 11 on valve stem 8 engages valve member 9 to interrupt the vent communication between brake cylinder 30 and atmosphere, and then disengages valve member 9 from supply valve seat 10. In this application position of valve assembly 4, fluid pressure communication is established between control reservoir 27 and brake cylinder 30 via passage 42, selector valve spool groove 41, passage 40, differential check valve 32, and a passage 51, the open supply valve, and passage 44. Concurrently, fluid pressure communication is also established between brake cylinder 30 and service reservoir 29 via a passage 52 and passage 51, in bypass of differential check valve 32.

As the pressure in control reservoir 27 reduces, the pressure drop is reflected in chamber 13 until a force balance condition (including the effect of return spring 16) is restored to valve assembly 4. When this occurs, spring 17 is effective to move the valve member back into engagement with supply valve seat 10 and thereby terminate further pressure supply to the brake cylinder, it being understood that exhaust valve seat 11 remains engaged with valve member 9 to prevent the venting of brake cylinder pressure. This is commonly referred to as lap condition of the brakes.

Due to the downward force exerted by return spring 16 on the valve assembly, a full service reduction of brake pipe pressure, i.e. a 20 psi. brake pipe reduction from a normal charging level at 70 psi. to 50 psi., results in the valve assembly assuming a lap condition, in which the control reservoir pressure is cut off from the brake cylinder, before the normal equalization or full service brake cylinder pressure of 50 psi. is obtained. By virtue of service reservoir 29, however, an additional volume of air is provided, which is selected to equalize with brake cylinder 30 at full service pressure of 50 psi., to compensate for the aforementioned adverse effect of spring 16. The differential check valve assures that an overreduction of brake pipe pressure will not result in a further increase in brake cylinder pressure, as would otherwise occur, since, as above mentioned, the control reservoir pressure is cut greater than the equalization or full service pressure of 50 psi. The value of the differential check valve bias spring is selected to establish the same pressure differential between the control reservoir and service reservoir pressures as exists between the opposing brake pipe and control reservoir pressures in chambers 12 and 13 across the main piston abutment 5 following a full service brake application. Thus, even if an overreduction of brake pipe pressure is made following a full service brake application, so as to actuate the service valve assembly 4 to application position, differential check valve 32 will prevent further equalization of the higher control reservoir pressure with the brake cylinder 30.

Release of either a partial or full service brake application in direct release mode is made completely, i.e., without partial releases, in response to an increase in brake pipe pressure sufficient to unbalance the valve assembly in a downward direction, irrespective of the degree of brake pipe pressure increase. When the pressure in chamber 12 exceeds the pressure in chamber 13 reduced by an amount corresponding to the force exerted by return spring 16, the piston valve assembly will be forced downward toward the brake release position shown. In the first increment of movement, exhaust valve 8 is pulled away from valve member 9, which remains engaged with supply valve seat 10. Air in brake cylinder 30 is thus exhausted to atmosphere via passage 44, release control choke 45, central passage 46 in stem 8, and passage 47.

When feedback piston 6 engages its stop, return spring 16 becomes caged, thereby removing its force from the valve assembly. Final downward movement of the main piston abutment 5 into engagement with its stop occurs relative to spool valve member 20 of charging and dissipation valve 18, which is held against further displacement by spring 25. Spool member 20 is thus reset to its normal charging position in which brake pipe pressure effective in chamber 12 is again communicated with chamber 13. Via this communication, any pressure changes in control reservoir 27 due, for example to temperature variations, is dissipated into the brake pipe, and undesired application of the brakes during brake release is thereby avoided.

In graduated release mode, handle 34 of selector valve 2 is operated to shift spool valve member 33 rightwardly from its direct release position, as shown, to its graduated release position. In this position, brake pipe charging passage 40 is cut off from passage 42 and connected instead to a passage 53 leading to auxiliary reservoir 28, which is thus charged from the brake pipe 26 via charging check valve 31. Control reservoir 27 is charged from brake pipe 26 via charging check valve 31. Control reservoir 27 is charged from brake pipe 26 via passage 35, chamber 12, charging and dissipation valve 18, choke 37, chamber 13, passage 43, and passage 42, in bypass of charging check valve 31, for a purpose hereinafter explained.

Also in graduated release position of selector valve 2, a branch passage 54 of passage 44 is connected to passage 48, which passage 48 is in turn cut off from atmosphere, thus permitting brake cylinder pressure to be registered in chamber 14 above feedback piston 6. Service reservoir 29 is charged in the same manner as in direct release mode.

When a brake application is made, the reduction of brake pipe pressure is reflected in chamber 12 above main piston abutment 5. Due to choke 37, the opposing control reservoir pressure in chamber 13 is unable to follow the exhausting brake pipe air and a pressure differential is established sufficient to force the main piston abutment upwardly. Owing to spring 16, however, feedback piston abutment 6, pusher stem 7 and accordingly the charging and dissipation valve 18 initially remain stationary, so that relative movement exists between the main piston abutment and charging and dissipation spool valve member 20 to reposition this valve and thereby cut off the communication between chambers 12 and 13. The pressure effective in chamber 13 is thus trapped and serves as a reference against which brake pipe pressure variations are measured in terms of a force differential across main piston abutment 5. Continued upward movement of the main piston abutment 5 in response to this force differential causes the piston abutment to pick up charging and dissipation spool valve member 20, which in turn drives pusher stem 7 and valve stem 8 upwardly, whereby exhaust valve seat 11 engages valve member 9 and concurrently lifts the valve member off its supply valve seat 10. Compressed air in auxiliary reservoir 28 is thus admitted to brake cylinder 30 via passage 53, groove 55 in selector valve spool 33, passage 40, differential check valve 32, passage 51, the open supply valve, and passage 44. Concurrently, fluid pressure communication is also established between brake cylinder 30 and service reservoir 29 via a passage 52 and passage 51, where it combines with the auxiliary reservoir air flowing to the brake cylinder. A branch passage 54 of passage 44 connects brake cylinder pressure to chamber 14 above feedback piston abutment 6 via groove 49 in selector spool valve 33 and passage 48.

When the brake cylinder pressure effective in chamber 14 and the coacting force of spring 16 exert a downward force on feedback piston abutment 6 sufficient to overcome the upward acting force differential on main piston abutment 5, spring 17 acting through valve member 9 will drive the valve assembly downward until valve member 9 engages supply valve seat 10 to cut off further supply of air to brake cylinder 30. It will be understood that exhaust valve seat 11 remains engaged with valve member 9 to prevent the venting of brake cylinder pressure. In this lap position, therefore, brake cylinder pressure is established under the influence of spring 16 and by virtue of the size ratio between the feedback piston abutment and the main piston abutment, which is well known in proportioning type brake control.

When a full service brake application is made, with a standard brake pipe pressure of 70 psi., valve assembly 4 assumes a lap position in which 50 psi. brake cylinder pressure is obtained in the same manner as explained in direct release mode of operation.

It will now be apparent that by the addition of service reservoir 29, sufficient additional air is provided for equalization with the brake cylinder to assure the desired 50 psi. full service brake cylinder pressure in both direct and graduated brake release modes, thereby compensating for the heretofore adverse effect of return spring 16, in causing the valve assembly 4 to lap off before the desired full service equalization of pressure had been attained. In addition, it will be appreciated that differential check valve 32 prevents either reservoir 27 or 28 (depending upon the mode of brake release) from further equalization with brake cylinder 30, in the event an overreduction of brake pipe pressure is made, i. e., a brake pipe reduction in excess of the 20 psi. full service brake pipe reduction.

Accordingly, the proper full service brake cylinder pressure is assured in both direct and graduated release modes, notwithstanding the effect of the return spring 16, and in addition, the maximum brake cylinder pressure attainable is limited to the full service value, even in the event of an overreduction of brake pipe pressure.

When a brake release is made from either a partial or a full service brake application in graduated release mode, by reason of a brake pipe pressure increase sufficient to unbalance the valve assembly 4 in a downward direction, spring 16 and the pressure in chamber 14 are effective to cause feedback piston 6 to follow the downward deflection of main piston abutment 5. This results in exhaust valve seat 11 pulling away from valve member 9, which remains engaged with supply valve seat 10. Air in brake cylinder 30 and thus the brake cylinder pressure effective in chamber 14 is vented to atmosphere until the downward acting force differential across valve assembly 4 is reversed sufficiently to restore the valve assembly to a lap condition. Accordingly, the reduction of brake cylinder pressure is terminated at a value consistent with the effective level of brake pipe pressure, thereby providing for brake release in increments or steps proportional to the increase in brake pipe pressure.

Having now described the invention, what we claim as new and desire to secure by Letters Patent, is:

1. A fluid pressure controlled vehicle brake apparatus comprising:
   (a) a brake pipe normally charged with fluid under pressure to a certain chosen value;
   (b) a control reservoir normally charged with fluid under pressure at said certain chosen value;
   (c) fluid pressure operated brake means for braking said vehicle;
   (d) a brake control service valve device operative in response to variation of said brake pipe fluid under pressure comprising:
      (i) a movable main piston abutment subject on one side to said brake pipe fluid under pressure and on the opposite side to said control reservoir fluid under pressure;
      (ii) a piston stem engageable at one end with said main piston abutment;
      (iii) valve means engageable with the other end of said piston stem for connecting fluid under pressure from said control reservoir to said brake means when said main piston abutment is actuated in a first direction in response to a reduction of said brake pipe pressure;
      (iv) a first passageway via which fluid under pressure is connected from said control reservoir and said opposite side of said main piston abutment to said valve means to effect pressurization of said brake means; and
      (v) spring means for biasing said main piston abutment in a direction opposite said first direction toward a lap position in which said connection of said control reservoir fluid under pressure with said brake means is interrupted when said control reservoir fluid under pressure is reduced to a value that exceeds the reduced brake pipe fluid under pressure by an amount sufficient to exert a differential force on said main piston abutment to counterbalance the bias force exerted by said spring means;
wherein the improvement comprises:
   (e) a one-way differential check valve in said first passageway via which said control reservoir fluid under pressure is supplied to said brake means by said valve means when said main piston abutment is actuated; and
   (f) a fluid pressure charged service reservoir connected to said first passageway downstream of said differential check valve so as to supply fluid pressure to said brake means in parallel with said control reservoir in bypass of said differential check valve.

2. A fluid pressure controlled vehicle brake apparatus, as recited in claim 1, further characterized in that said differential check valve is selected to establish a fluid pressure differential between said control reservoir and said brake means in said lap position of said main piston abutment corresponding to the pressure differential between said control reservoir and said brake pipe due to the effect of said bias spring means on said main piston abutment.

3. A fluid pressure controlled vehicle brake apparatus, as recited in claim 2, further comprising:
   (a) a second branch passage between said first passageway and said brake pipe; and
   (b) charging check valve means in said second branch passage for charging said control reservoir to said normally chosen value and for charging said service reservoir via said differential check valve to a value less than said certain chosen value.

4. A fluid pressure controlled vehicle brake apparatus, as recited in claim 1, further comprising:
   (a) an auxiliary reservoir normally charged with fluid under pressure at said certain chosen value;
   (b) said brake control service valve means further comprising a movable feedback piston abutment to which said piston stem is fixed; and
   (c) selector valve means for providing a direct release mode of operation of said service valve device and a graduated release mode of operation of said service valve device including a manually positionable spool valve having a first position corresponding to said direct release mode of operation in which fluid pressure communication is established in said first passageway to effect said connection of said control reservoir and said opposite side of said main piston abutment with said valve means, and having a second position corresponding to said graduated release mode of operation in which said first passageway is disconnected from said control reservoir and said opposite side of said main piston abutment and concurrently connected to said auxiliary reservoir, and further in which second position fluid pressure communication is established between said brake means and said one side of said feedback piston abutment corresponding to said one side of said main piston abutment.

5. A fluid pressure controlled vehicle brake apparatus, as recited in claim 4, wherein said valve means in said graduated release mode is operable upon actuation of said main piston abutment to connect said service reservoir fluid under pressure to said brake means in parallel with said auxiliary reservoir fluid under pressure in bypass of said differential check valve.

6. A fluid pressure controlled vehicle brake apparatus, as recited in claim 5, further comprising charging and dissipation valve means carried by said main piston abutment for effecting said engagement of said main piston abutment with said one end of said piston stem and for further providing a charging communication via which said control reservoir is charged from said brake pipe in said second position of said spool valve.

7. A fluid pressure controlled vehicle brake apparatus, as recited in claim 5, wherein the volume of said auxiliary reservoir is the same as the volume of said control reservoir.

* * * * *